United States Patent [19]

Gandrud et al.

[11] 4,008,833
[45] Feb. 22, 1977

[54] CHEMICAL APPLICATOR

[76] Inventors: Ebenhard S. Gandrud, 528 Gandrud Road; Dale E. Gandrud, 640 Cardinal Drive, both of Owatonna, Minn. 55060

[22] Filed: Mar. 15, 1976

[21] Appl. No.: 666,885

[52] U.S. Cl. .................................. 222/178; 111/10; 172/311
[51] Int. Cl.² ......................................... A01C 15/00
[58] Field of Search .......... 222/176, 177, 178, 334; 111/10; 172/311, 456, 662

[56] References Cited
UNITED STATES PATENTS 3,186,719  6/1965  Sosalla et al. ................. 222/178 X Primary Examiner—Stanley H. Tollberg
Assistant Examiner—Hadd Lane

[57] ABSTRACT

A wheel mounted frame and a pair of elongated rigid support members having inner end portions pivotally mounted on the frame for movements of the support members between operative positions extending transversely outwardly, each in an opposite direction from the frame, and inoperative transport positions extending rearwardly from the frame. Wheel mounted members support the outer ends of the support members, and tension members are operatively connected to the support members and the frame to releasably lock the support members in their operative positions. A locking arm is connected to the support members to releasably hold the support members in their inoperative rearwardly extending positions, and applicator hoppers are mounted on the support members with adjacent ends of the hoppers in overlapping relationship.

12 Claims, 11 Drawing Figures

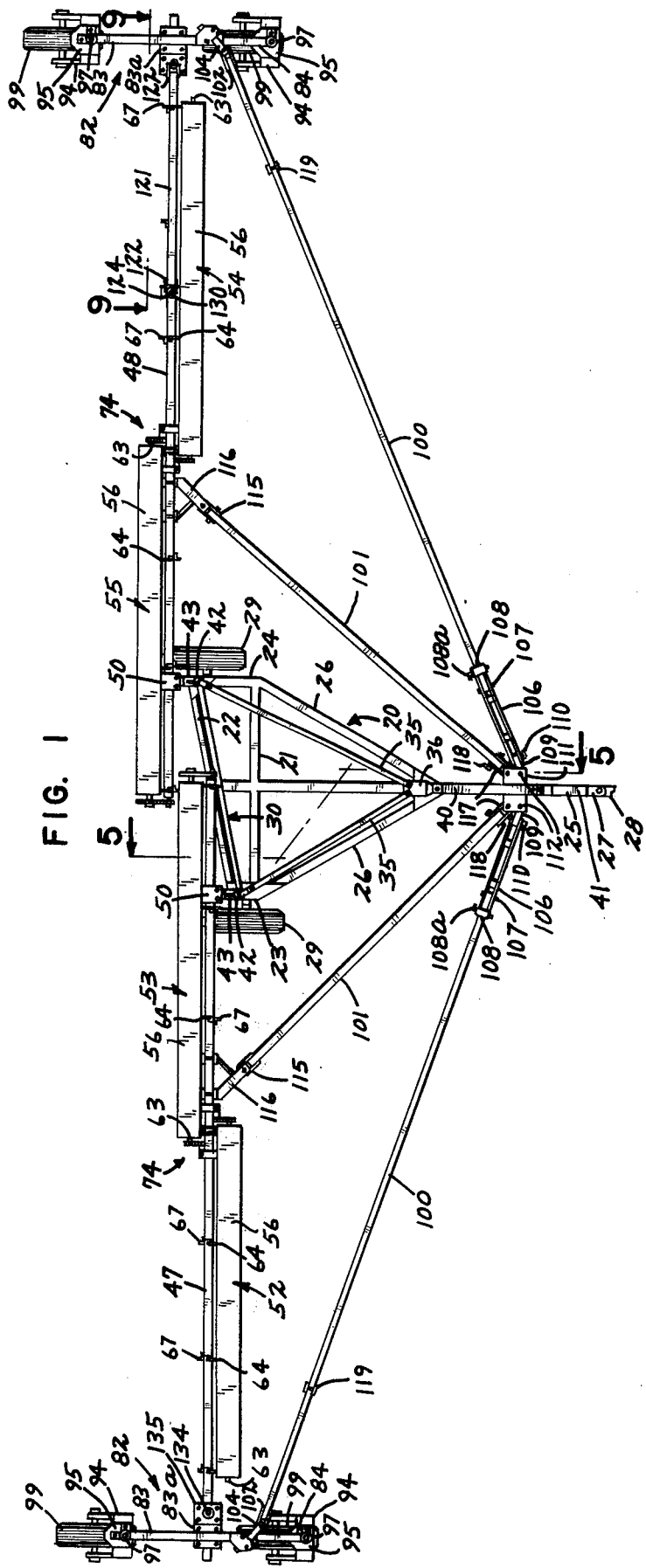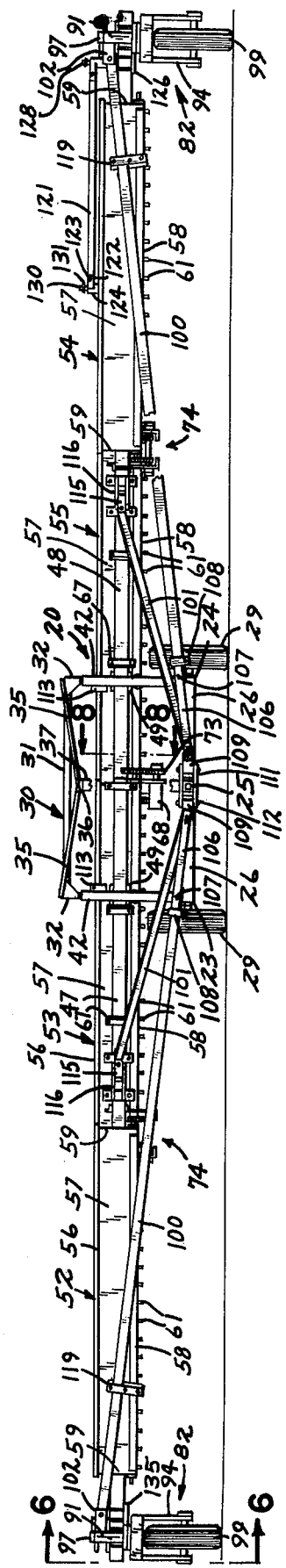

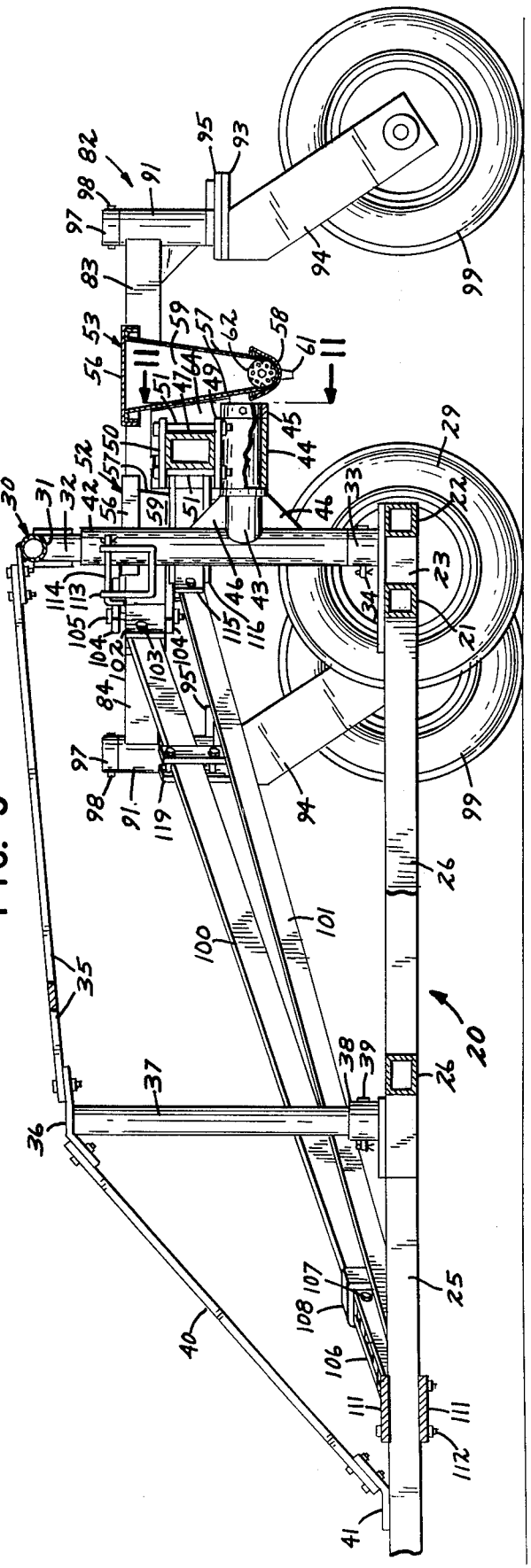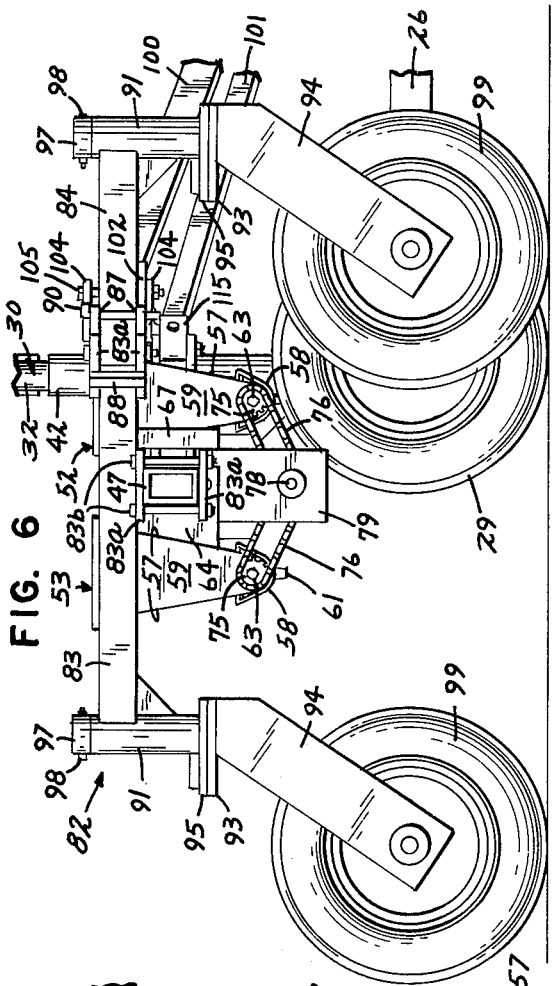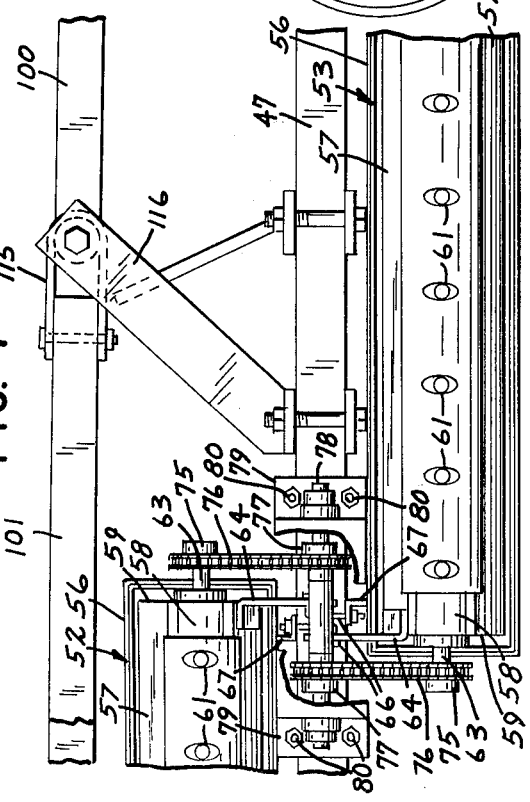

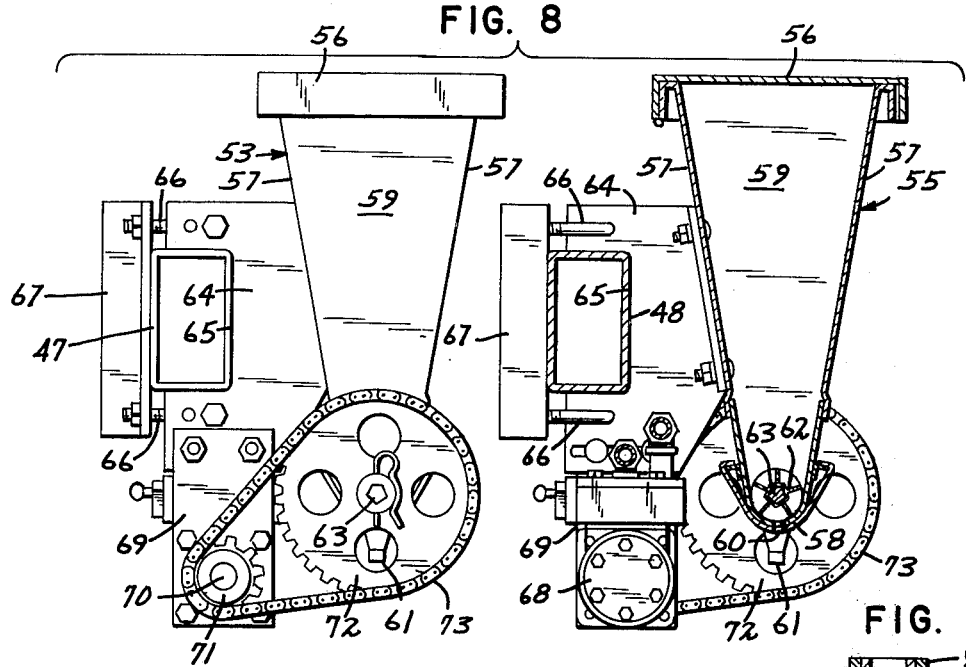
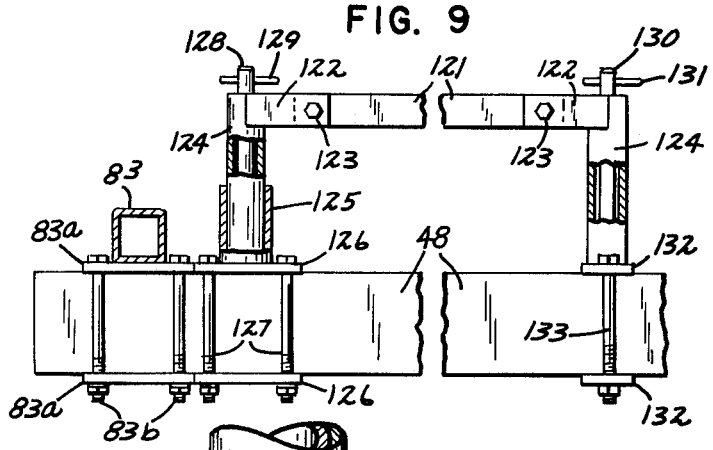
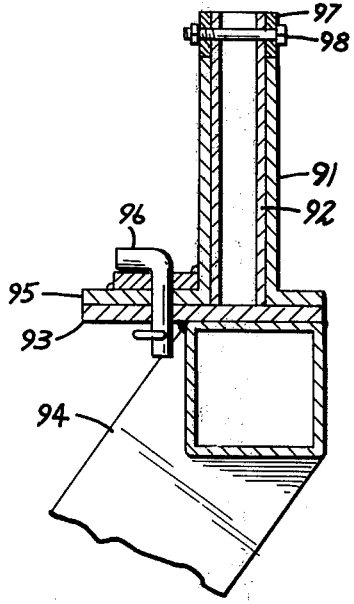
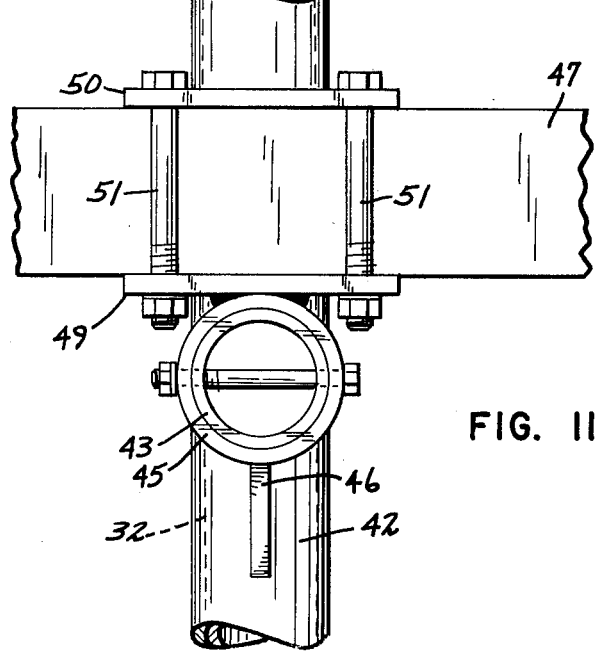

CHEMICAL APPLICATOR

BACKGROUND OF THE INVENTION

This invention relates generally to devices for applying granular material, such as fertilizer and related chemicals in granular form, to the ground for the promoting of crop growth and protection. More specifically, this invention is in the nature of an improvement over other devices of the type disclosed in earlier U.S. Pat. Nos. 2,350,107 and 2,929,634, issued to E.S. Gandrud, co-inventor of this invention. At the present time, the practice of farming on a very large scale demands the use of implements which can effectively treat a large area of ground with a minimum number of traverses of the implement over the ground.

SUMMARY OF THE INVENTION

The applicator of this invention involves a rigid frame having means whereby the same may be attached to a draft vehicle, and a pair of laterally spaced wheels supporting the frame. A pair of elongated rigid support members each have inner and outer ends, and means is provided for pivotally mounting the support members adjacent their inner ends to the frame for swinging movements on horizontal axes, and for other swinging movements on vertical axes between operative positions wherein the support members extend outwardly from opposite sides of the frame transversely of the direction of movement of the frame, and inoperative transport positions generally normal to said operative positions and in trailing relation to the frame. Outer support means for supporting the outer ends of the support members in both of the operative and transport positions of the support members are provided, as are locking means for releasably locking the support members in both of said positions of swinging movement thereof on said vertical axes, while permitting free swinging movement of the support members on said horizontal axes. Elongated hopper means are mounted on the support members and have adjacent inner ends disposed in overlapping relationship when the support members are moved to their operative positions.

BRIEF DESCRIPTION OF THE DRAWINGS

FIG. 1 is a view in top plan of an applicator for granular material produced in accordance with the invention, some parts being broken away;

FIG. 2 is a view in front elevation of the applicator of FIG. 1;

Figures 3, 4:
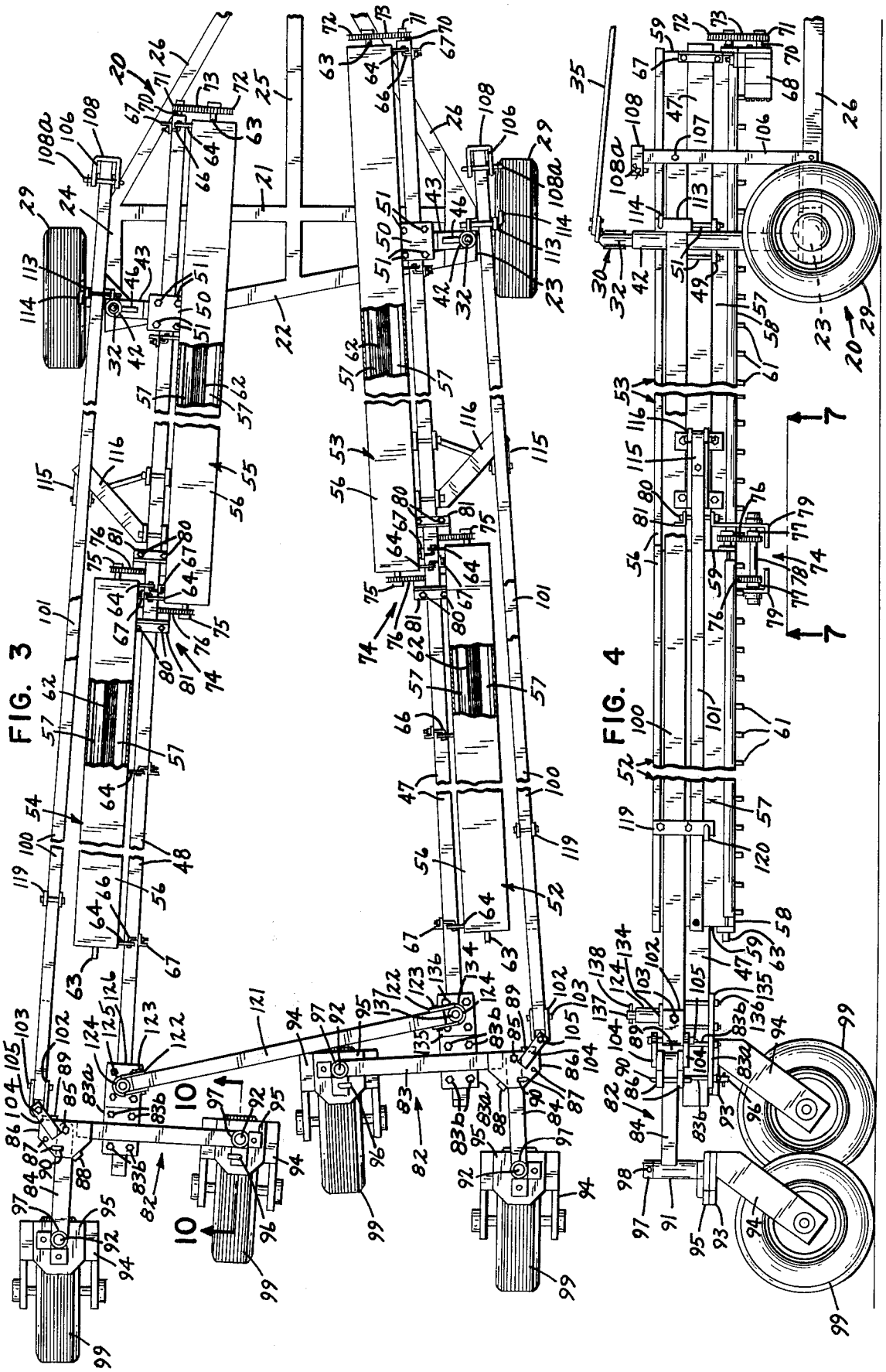
FIG. 3 is an enlarged fragmentary view in plan, showing the applicator in an inoperative or transport position.

FG. 4 is a fragmentary view in side elevation as seen from the bottom of FIG. 3;

FIG. 5 is an enlarged fragmentary view in transverse section taken on the irregular line 5—5 of FIG. 1;

FIG. 6 is an enlarged fragmentary end elevation as seen from the line 6—6 of FIG. 2;

FIG. 7 is an enlarged fragmentary view in bottom plan as seen from the line 7—7 of FIG. 4, some parts being broken away;

FIG. 8 is an enlarged view partly in end elevation and partly in section, taken on the line 8—8 of FIG. 2;

FIG. 9 is an enlarged fragmentary view in rear elevation as seen from the line 9—9 of FIG. 1;

FIG. 10 is an enlarged fragmentary section taken on the line 10—10 of FIG. 3; and FIG. 11 is an enlarged fragmentary view in elevation as seen from the line 11—11 of FIG. 5.

DETAILED DESCRIPTION OF THE PREFERRED EMBODIMENT

In the drawings, a rigid frame 20 is shown as comprising a pair of front and rear cross frame members 21 and 22, end frame members 23 and 24, and elongated center frame member 25 that extends forwardly from the rear cross frame member 22 through the cross-frame member 21, and a pair of forwardly converging angular members 26 that are connected at their rear ends to respective ones of the end frame members 23 and 24 and at their front ends to the center frame member 25. The frame members 21–26 are fabricated from cross-sectionally rectangular tubing such as steel. At its front end, the center frame member 25 is provided with a conventional tongue 27 for connection to a drawbar or the like 28 of a tractor or other draft vehicle, not shown, the drawbar 28 being shown fragmentarily in FIG. 1. The frame 20 is supported by a pair of laterally spaced pneumatic tire equipped wheels 29. The frame 20 further includes an inverted generally U-shaped frame section 30 having a horizontally disposed intermediate portion 31 and a pair of depending legs 32 extending downwardly from opposite end of the intermediate portion 31, the lower ends of the legs 32 being received in upwardly opening sockets 33 rigidly secured to the end frame members 23 and 24. The lower ends of the legs 32 are releasably held in the sockets 33 by suitable means such as anchoring pins or the like 34, see particularly FIG. 5. The U-shaped frame section 30 is braced by a pair of rigid struts 35 that are suitably anchored at their rear ends to the opposite ends of the intermediate frame section portion 31. The struts 35 converge forwardly with respect to the frame 20 and have their front ends bolted or otherwise rigidly secured to an anchoring plate 36 mounted fast on the upper end of a vertical post 37 which has its lower end received in a socket 38 welded or otherwise rigidly secured to the center frame member 25 at the junction thereof with the angular members 26. The lower end of the post 37 is held in the socket 38 by an anchoring pin or the like 39. A third strut 40 is secured at one end to the anchoring plate 36, from whence it slopes angularly downwardly and forwardly, the front end of the strut 40 being secured to a bracket 41 that is welded to the center frame member 25, as shown particularly in FIG. 5.

The legs 32 of the frame section 30 are in the form of cylindrical tubes, and each have telescoped thereover one of a pair of mounting tubes 42 that have lower ends resting on the upper ends of the sockets 33, the tubes 42 being rotatable on their respective legs 32. Intermediate their ends, the tubes 43 have horizontally disposed trunnions 43 extending radially outwardly therefrom, the trunnions 43 having journaled thereon tubular members 44 that are held against axial movement on the trunnions 43 by retaining rings 45 pinned or otherwise secured to the outer ends of the trunnions 43, see particularly FIGS. 5 and 11. As shown in FIG. 5, the trunnions 43 are reinforced by gussets or the like 46 welded thereto and to their respective mounting tubes 42.

The mounting tubes 42 support a pair of elongated rigid support members in the nature of cross-sectionally rectangular tubes 47 and 48 that are normally horizontally disposed and each of which, in its operative position, extends transversely outwardly of a different side of the frame 20. Each of the tubular members 44 has welded thereon a clamping plate 49 that is adapted to underlie a respective one of the tubes 47 and 48 and which cooperates with a clamping plate 50 and a plurality of nut-equipped clamping screws 51 to rigidly clamp a respective one of the support tubes 47 or 48 to its respective tubular member 44. As shown, the support tubes 47 and 48 are secured to the tubular members 44 near the inner ends of the support tubes, so that the inner ends thereof are disposed in overlapping relationship when the support tubes 47 and 48 are disposed in their operative positions, see particularly FIG. 1. As there shown, the frame section 30 is so disposed as to locate the support tube 47 forwardly of the support tube 48, so as to permit overlapping of the inner ends of the tubes 47 and 48.

The support member or tube 47 has mounted thereon a pair of elongated spreader or applicator hoppers 52 and 53, the former being disposed forwardly of the support tube 47 and the latter being disposed rearwardly thereof. In the same arrangement, a pair of applicator hoppers 54 and 55 are mounted on the support member or tube 48, see particularly FIGS. 1 and 3. It will be noted that the hoppers 52 and 53 have adjacent ends in overlapping relationship as do the hoppers 54 and 55. In the position of the support members or tubes 47 and 48, shown in FIG. 1, the inner or adjacent ends of the hoppers 53 and 55 are also disposed in overlapping relationship for a purpose which will hereinafter become apparent.

The hoppers 52–55 are preferably of the type disclosed in the above-identified Gandrud patents, each having covers 56, downwardly converging sidewalls 57 and cross-sectionally arcuate bottom walls 58 and opposite end walls 59. The arcuate bottom walls 58 are provided with longitudinally spaced discharge openings 60 and discharge spouts 61 for discharging granular material from the interior of the hoppers to the ground. Each of the hoppers 52–55 contains a longitudinally extending agitator 62 in closely overlying relationship to the arcuate bottoms 58 thereof, the agitators 62 each including an elongated shaft 63 journaled in suitable bearings in the end walls 59 of the hoppers, the shafts 63 projecting longitudinally outwardly from opposite ends of the hoppers 52–55. As shown in FIG. 7, the overlapping relationship of adjacent ends of the hoppers causes the spacing between the spouts 61 at the adjacent ends of the overlapping hoppers to be substantially equal to the spacing of the spouts 61 in each of the several hoppers, so that even spreading of the granular material over the ground is achieved.

Each of the hoppers 52–54 is provided with a plurality of mounting brackets 64 that are formed to provide notches 65 which receive respective ones of the support tubes 47 and 48. Each of the brackets 64 is provided with a pair of L-shaped clamping screws 66 that extend through suitable openings in rigid clamping bars 67 that engage sides of their respective support tubes 47 and 48 opposite the brackets 64 to rigidly clamp the several hoppers in place on the support tubes 47 and 48.

Rotation is imparted to the various agitators 62 by a pair of hydraulically operated rotary motors 68 that are mounted on mounting plates 69, bolted or otherwise rigidly secured to brackets 64 at the adjacent inner ends of the hoppers 53 and 55. Each motor 68 has a drive shaft 70 on which is mounted a sprocket wheel 71. The agitator shaft 63 of each hopper 53 and 55 has mounted thereon a sprocket wheel 72. Endless link chains 73 are entrained over respective ones of the sprocket wheels 71 and their cooperating sprocket wheels 72. The agitators 62 of the hoppers 52 and 54 are driven from the agitators 62 of the hoppers 53 and 55 respectively by power transmission mechanisms indicated generally at 74, one of the mechanisms shown in detail in FIG. 7. As there shown, the outwardly projecting ends of the agitator shafts 63 have mounted thereon sprocket wheels 75 over which are entrained endless link chains 76, these being also entrained over other sprocket wheels 77 that are mounted on a jackshaft 78. The jackshaft 78 is journaled in suitable bearings mounted in bearing brackets 79 rigidly secured to respective ones of the support members or tubes 47 and 48 by clamping screws 80 and cooperating clamping bars 81.

The outer ends of the support tubes 47 and 48 are supported from the ground by a pair of end frames indicated generally at 82. Each end frame 82 comprises a pair of rigid end frame sections 83 and 84, the former of which is rigidly secured to a respective support tube 47 and 48 by means of a pair of clamping plates 83a and cooperating nut-equipped clamping screws 83b. One of the clamping plates 83a of each pair is welded to its respective frame section 83. The frame sections 83 and 84 are pivotally connected together on a generally vertical axis by means of a pivot pin 85, each end frame section 83 having a pair of bearing plates 86 at its inner end, the inner end portion of the end frame sections 84 moving between the bearing plates 86, the pivot pins 85 being mounted in the bearing plates 86. The bearing plates 86 are provided with pairs of aligned openings 87 and connected together with stop lugs 88 and 89. The stop lugs 88 and 89 cooperate with a pin 90 that is insertable into selected pairs of openings 87 to releasably lock each end frame section 84 in alignment with its respective end frame section 83, as shown in FIG. 1 or at generally right angles to its respective end frame section 83, as shown in FIG. 3. Each end frame section 83 and 84 is provided at its outer end with a vertically extending tubular bearing 91 in which is journaled a tubular stem 92 rigidly secured and extending upwardly from a bearing plate 93 that is welded to the upper tubular end of a fork 94. A bearing plate 95 is rigidly secured to the lower end of each tubular bearing 91 and is disposed in overlying engagement with a respective one of the bearing plates 93, the plates 93 and 95 having alignable openings therethrough for reception of a locking pin 96 for releasably locking each tubular stem 92 and its respective fork 94 against rotation within the respective tubular bearing 91. Each tubular stem 92 and its fork 94 are held against downward movement relative to its respective tubular bearing 91 by a retaining ring 97 secured to the extended upper end of each stem 92 by nut-equipped screw or the like 98. Each fork 94 has journaled therein a tire-equipped supporting wheel 99, the axis of each wheel 99 being laterally offset from the vertical axis of its respective tubular stem 92, so that each wheel 99 operates as a caster wheel when its respective locking pin 96 is removed from the bearing plates 93 and 95 to permit rotary movement of the tubular stem 92 within the tubular bearing 91 respective thereto. When the support tubes 47 and 48 are in their operative positions, each end frame section 84 is disposed in alignment with its respective frame section 83, as shown in FIG. 1, and the locking pins 96 are removed so that the outer wheels 99 may swivel freely about the axes of their respective bearings 91.

Means for releasably locking the support members or tubes 47 or 48 in their operative positions of FIGS. 1 and 2 comprises pairs of outer and inner tension members 100 and 101 respectively having opposite ends that are operatively piviotally connected to the support tubes 47 and 48 and releasably pivotally secured to the center frame member 25 near the front end thereof. Each of the outer tension members 100 is pivotally connected at its outer end to a coupling member 102 for pivotal movements on a generally horizontal axis, by means of a pivot pin or the like 103. Each coupling member 102 is pivotally connected between a pair of connecting bars 104 for swinging movements on a generally vertical axis, the connecting bars 104 being welded to the bearing plates 86. Pivot pins 105 extend through the bars 104 and coupling members 102. The inner end portions of the tension members 100 comprise elongated rigid links 106 that are pivotally connected at one end portion to respective ones of the tension members 100 by means of generally horizontally disposed pivot pins 107, the links 106 being provided with stop bars 108 and pins 108a which limit pivotal movements of the links 106 with their respective members 100. At their inner ends, the links 106 are pivotally connected to coupling members 109 by pivot pins 110 on horizontal axes, the coupling members 109 being disposed between a pair of support plates 111 welded to the upper and lower surfaces of the center frame member 25. The coupling members 109 are pivotally connected between the plates 111 by vertically disposed pivot pins 112.

The piviot pins 110 are easily removed to permit the links 106 to be disconnected from the coupling members 109 so that each tension member 100 may be disconnected from the center frame member 25 and stored in one of a pair of upwardly opening U-shaped brackets 113 each welded to a different one of the mounting tubes 42 and provided with a retaining pin 114. As shown in FIGS. 3 and 4, when the tension members 100 are supported in the brackets 113, the links 106 swing downwardly about the axes of their pivot pins 107 so as to be disposed in a generally vertical position. This arrangement permits the support tubes 47 and 48 and parts carried thereby to be moved between their inoperative transport positions of FIG. 3 to their operative positions of FIG. 1 without having interfering parts between the mechanisms carried by the support tubes 47 and 48.

Each of the inner tension members 101 have outer ends pivotally connected to coupling members 115 on generally horizontal axes, the coupling members 115 being pivotally connected to brackets 116 for swinging movements on generally vertical axes in the same manner that the outer ends of the tension members 100 are connected to the end frames 82. At their inner ends, each of the tension members 101 are releasably pivotally connected to coupling members 117 for swinging movements on generally horizontal axes, by removable pivot pins 118, the coupling members 117 being pivotally connected between the plates 111 for swinging movements on generally vertical axes, the coupling members 117 being substantially identical to the coupling members 115, 109, and 102. When the tension members 100 are placed in their inoperative positions in the brackets 113, the tension members 101 may be disconnected from their coupling members 117 and swung outwardly away from the plates 111 and into underlying relationship with respective ones of the tension members 100, as shown in FIGS. 3 and 4. The tension members 100 have supporting brackets 119 extending downwardly therefrom for reception of the adjacent tension members 101. The tension members 101 are held in the brackets 119 by removable retainer pins 120, see particularly FIGS. 3, 4, and 5.

When it is desired to move the apparatus of the present invention from one area of operation to another, such as through a gate or by traveling on a road, it is necessary that the support members or tubes 47 and 48 and parts connected therewith be moved from their operative positions of FIGS. 1 and 2 to inoperative transport positions shown in FIGS. 3 and 4. To accomplish this purpose, the tension members 100 and 101 are separated from their connection with the center frame member 25, the tension members 100 being moved into their supporting brackets 113 and the tension members 101 being moved into their respective supporting brackets 119. Thereafter, the support tube 47, together with its hoppers 52 and 53, end frame 82 and caster wheels 99, is swung rearwardly or in a clockwise direction with respect to FIG. 1 to its inoperative transport position of FIG. 3, after which the support tube 48 with the parts connected thereto are swung rearwardly or in a counterclockwise direction with respect to FIG. 1, to its transport position of FIG. 3. In order that the end frames 82 are effectively shortened so that the apparatus is reduced to a minimum width, the end frame sections 84 are pivotally moved to their positions of FIG. 3 and locked therein between the stop lugs 88 and retainer pins 90.

Means for releasably locking the support members 47 and 48 and parts associated therewith in their inoperative transport positions comprises a rigid locking arm 121 having coupling members 122 pivotally connected to the opposite ends thereof by horizontally disposed pivot bolts or the like 123. Each coupling member 122 includes a generally vertically disposed tubular portion 124 one of which is rotatably and slidably received in an upward opening socket 125 welded to one of a pair of clamping plates 126, the clamping plates 126 cooperating with clamping screws 127 to mount the socket 125 on the support tube 48. A holding shaft 128 extends axially upwardly of the socket 125 and is loosely received within the adjacent coupling member portion 124, the shaft 128 being provided with a detachable retaining pin or the like 129. A second vertically disposed shaft 130, similar to the shaft 128 is provided with a detachable retaining pin 131, the shaft 130 extending upwardly from one of a pair of clamping plates 132 that cooperate with a pair of nut-equipped clamping screws 133 to mount the shaft 130 on the support tube 48, see FIG. 9. It will be noted that the retaining pins 129 and 131 are disposed above the coupling members 122 to limit upward movement of the coupling members 122 and locking arm 121.

A socket 134 is similar to the socket 125 and extends upwardly from one of a pair of mounting or clamping plates 135 that cooperate with nut-equipped clamping screws 136 to mount the socket 134 on the outer end portion of the support tube 47 adjacent the end frame 82 thereof. The socket 134 has an axial shaft 137 extending upwardly therethrough, the shaft 137 having a transverse retainer pin 138 in the upper end portion thereof and, like the retainer pins 129 and 131, being removable from the shaft 137.

Normally, when the apparatus of this invention is in its operative condition of FIGS. 1 and 2, the locking arm 121 is mounted on the shafts 128 and 130 in an inoperative storage position. When the support members or tubes 47 and 48 are moved to their inoperative transport positions of FIGS. 3 and 4, one end of the locking arm 121 is removed from engagement with the shaft 130 and swung to a position generally transverse to the support tube 48, the opposite coupling 122 being placed over the shaft 137 and into the socket 134, after which the retainer pin 138 is applied to the shaft 137. The tubular portion 125 within the socket 134 is rotatable therein, the locking arm 121 holding the outer or rear ends of the support members 47 and 48 in a predetermined spaced apart relationship. The angular relationship between the support members 47 and 48 in their inoperative transport positions is somewhat different than that shown in FIG. 3 due to the fact that in FIG. 3, the apparatus is substantially shortened due to removal of portions thereof.

During operation of the apparatus of this invention, the pivotal connections of the support members or tubes 47 and 48 with the trunnions 43, as well as the horizontal connections of the opposite ends of the tension members 100 and 101, permit the outer wheels 99 to closely follow the ground terrain without placing strain on any of the parts of the apparatus. When the apparatus is folded, as in FIGS. 3 and 4, and locked together with the locking arm 121, one of each of the caster forks 94 is locked against swiveling movements by use of the locking pin 96, permitting the remaining forks 94 to partake of caster swiveling movements. The pivotal connections between the locking arm 121 and the sockets 125 and 134 permit the rear end of each support member 47 and 48 and parts associated therewith to rise and fall independently of the other thereof whereby to enable the apparatus to closely follow the contour of the ground. The overlapping relationship of all of the hoppers 52–55 assure an even spreading of granular material on the ground over the entire width of the machine so that uniform spreading of the granular material over the ground is assured.

While a commercial embodiment of the applicator of this invention is shown and described, it will be understood that the same is capable of modification without departure from the spirit and scope of the invention, as defined in the claims.

What is claimed is:

1. An applicator for granular material comprising:
   a. a rigid frame having means for connection to a draft vehicle;
   b. a pair of laterally spaced wheels supporting said frame;
   c. a pair of elongated rigid support members each having inner and outer ends;
   d. means pivotally mounting said support members near their inner ends to said frame for swinging movements on horizontal axes, and for other swinging movements on vertical axes between operative positions wherein said members extend outwardly from opposite sides of said frame transversely of the direction of movement of said frame, and inoperative transport positions generally normal to said operative positions and in trailing relationship to said frame;
   e. outer support means for supporting the outer ends of said support members in the operative and transport positions of said support members;
   f. locking means for releasably locking said support members in both said positions of swinging movement on said vertical axes while permitting free swinging movement of said support members on said horizontal axes;
   g. and elongated hopper means on each of said support members, said hopper means having inner ends arranged to be disposed in overlapping relationship when said support members are moved to said operative positions thereof.

2. The applicator defined in claim 1 in which said hopper means comprises pairs of elongated hoppers, a pair of each thereof being mounted on each of said support members and extending longitudinally thereof, the hoppers of each of said pairs thereof having adjacent ends in overlapping relationship.

3. The applicator defined in claim 2 characterized by pairs of rotary applicator shafts extending longitudinally through respective ones of said hoppers of each pair thereof and journaled therein, power operated means for imparting rotation to one of the shafts of each pair thereof and power transmission connections between the shafts of each pair of shafts.

4. The applicator defined in claim 3 in which said power transmission connections comprise jackshafts rotatively mounted between the overlapping end portion of the hoppers of each pair thereof on axes parallel to respective applicator shafts, aligned pairs of sprocket wheels on the adjacent ends of said applicator shafts and said jackshafts, and endless link chains entrained over said aligned pairs of sprocket wheels.

5. The applicator defined in claim 1 in which said outer support means comprises a pair of end frames each secured to the outer end of a respective one of said support members and normally extending transversely thereof, and caster wheels pivotally mounted on the opposite ends of each of said end frames.

6. The applicator defined in claim 1 in which said outer support means comprises a pair of end frames each including a pair of end frame sections having inner ends pivotally secured together on a generally vertical axis, and outer ends, caster wheel forks journaled on said outer ends of said end frame sections, means securing one of the sections of each end frame to the outer end of a respective one of said support members, and means for releasably locking the other end frame section of each end frame selectively in alignment with its respective one of the end frame sections and at generally right angles thereto.

7. The applicator defined in claim 1 in which said locking means comprises a pair of elongated tension members, pivot means operatively connecting one end of each of said tension members to a different one of said support members for swinging movements relative to said support members, and pivot means for releasably connecting the other ends of said tension members to said frame in forwardly spaced relation to said wheels and for swinging movements relative to said frame.

8. The applicator defined in claim 7 in which said pivot means comprise connectors elements and cooperating pairs of pivot shafts at opposite ends of said tension members and extending transversely of said tension members, the axes of the pivot shafts of each pair thereof being disposed normal to each other.

9. The applicator defined in claim 8 in which said tension members are disposed in forwardly converging relationship when connected to said frame in the operative support member locking position thereof, said frame including support brackets for said tension members when said tension members are moved from operative locking position to inoperative storage positions generally parallel to said support members.

10. The applicator defined in claim 1 in which said locking means includes a rigid locking arm pivotally connected at one end to one of said support members and having means at its opposite end for pivotal connection to the other one of said said support members when said members are moved to their inoperative transport positions, to hold said support members in a given spaced apart relationship during transport.

11. An applicator for a granular material comprising:
 a. a rigid frame having a rear end portion and a forwardly extending portion;
 b. means on the front end of said forwardly extending portion for connection to a draft vehicle;
 c. a pair of laterally spaced wheels supporting the rear end portion of said frame;
 d. a pair of elongated rigid support members each having inner and outer ends;
 e. means pivotally mounting said support members near their inner ends to said frame for swinging movements on horizontal axes and for other swinging movements on vertical axes between operative positions, wherein said support members extend outwardly from opposite sides of said frame transversely of the direction of movement of said frame, and inoperative transport positions generally normal to said operative positions and in trailing relationship to said frame;
 f. outer support means for supporting the outer ends of said support members in the operative and transport positions of said support members;
 g. a pair of elongated tension members each having an outer end operatively connected to a portion of a different one of said support members laterally outwardly of said frame for swinging movements on vertical and horizontal axes, said tension members having inner ends detachably pivotally connected to said forwardly extending frame portion near the front end thereof to hold said support members in their operative positions;
 h. and elongated hopper means on each of said support members, said hopper means having inner ends arranged to be disposed in overlapping relationship when said support members are moved to said operative positions thereof;
 i. said frame including tension member supporting means at the rear end portion thereof for receiving the inner end portions of said tension members when said tension members are disconnected from said forwardly extending frame portion.

12. The applicator defined in claim 11, characterized by a rigid locking arm pivotally connected at one end to one of said support members for movements between an inoperative position overlying said one of said support members and an operative position extending transversely of said one of the support members, the other end of said arm having means for pivotal connection to the other support member when said support members are moved to their inoperative transport positions.

* * * * *

UNITED STATES PATENT AND TRADEMARK OFFICE
CERTIFICATE OF CORRECTION

PATENT NO. : 4,008,833

DATED : February 22, 1977

INVENTOR(S) : Ebenhard S. Gandrud and Dale E. Gandrud

It is certified that error appears in the above-identified patent and that said Letters Patent are hereby corrected as shown below:

Column 6, line 43, the word "upward" should be changed to the word --upwardly--.

Column 7, line 14, the numeral "125" should be changed to the numeral --124--.

Signed and Sealed this sixteenth Day of August 1977

[SEAL]

Attest:

RUTH C. MASON
*Attesting Officer*

C. MARSHALL DANN
*Commissioner of Patents and Trademarks*